US012777463B2

(12) United States Patent
Liu et al.

(10) Patent No.: US 12,777,463 B2
(45) Date of Patent: Oct. 27, 2026

(54) METHOD AND DEVICE FOR TRANSMITTING PAGING MESSAGE, AND METHOD AND DEVICE FOR RECEIVING PAGING MESSAGE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Xiaoman Liu, Beijing (CN); Li Chai, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 331 days.

(21) Appl. No.: 18/681,596

(22) PCT Filed: Aug. 12, 2022

(86) PCT No.: PCT/CN2022/112117
§ 371 (c)(1),
(2) Date: Feb. 6, 2024

(87) PCT Pub. No.: WO2023/016552
PCT Pub. Date: Feb. 16, 2023

(65) Prior Publication Data

US 2024/0349243 A1 Oct. 17, 2024

(30) Foreign Application Priority Data

Aug. 13, 2021 (CN) ........................ 202110930512.8

(51) Int. Cl.
*H04W 68/02* (2009.01)
*H04W 76/28* (2018.01)

(52) U.S. Cl.
CPC ........... *H04W 68/02* (2013.01); *H04W 76/28* (2018.02)

(58) Field of Classification Search
CPC ... H04W 68/02; H04W 76/27; H04W 68/005; H04W 76/10; H04W 76/30; H04W 60/04;
(Continued)

(56) References Cited

U.S. PATENT DOCUMENTS

2012/0263089 A1* 10/2012 Gupta .................. H04W 72/30 370/312
2013/0294321 A1* 11/2013 Wang ................... H04W 28/16 370/312
(Continued)

FOREIGN PATENT DOCUMENTS

CN 112954617 A 6/2021
CN 113225695 A 8/2021
(Continued)

OTHER PUBLICATIONS

Office Action for corresponding JP application No. 2024-508105, mailed Dec. 17, 2024 (12 pages) English and Japanese language translations.

(Continued)

*Primary Examiner* — Kwasi Karikari
(74) *Attorney, Agent, or Firm* — Maginot, Moore & Beck, LLP

(57) ABSTRACT

A method for transmitting a paging message, includes: when a multicast and broadcast service (MBS) session is about to be activated, transmitting, by an access and mobility management function (AMF), a paging message to respective
(Continued)

base stations in a paging area, according to respective situations of the base stations for supporting an MBS.

18 Claims, 2 Drawing Sheets

(58) Field of Classification Search
CPC ....... H04W 76/28; H04W 4/06; H04W 24/10; H04W 36/0007; H04W 74/04; H04W 74/217
See application file for complete search history.

(56) References Cited

U.S. PATENT DOCUMENTS

| | | | | |
|---|---|---|---|---|
| 2020/0092923 | A1 | 3/2020 | Abraham et al. | |
| 2020/0344576 | A1* | 10/2020 | Li | H04W 4/06 |
| 2023/0096763 | A1* | 3/2023 | Vesely | H04W 76/11<br>370/312 |
| 2024/0172175 | A1* | 5/2024 | Li | H04L 12/189 |
| 2024/0260134 | A1* | 8/2024 | Babaei | H04W 4/06 |

FOREIGN PATENT DOCUMENTS

| | | | |
|---|---|---|---|
| WO | 2021091307 | A1 | 5/2021 |
| WO | 2021154277 | | 8/2021 |

OTHER PUBLICATIONS

Lenovo, Motorola Mobility, Discussion on Group paging for Multicast Session Activation Notification, 3GPP TSG RAN WG3 Meeting #113e, Online Aug. 16-26, 2021, R3-213743 (3 pages).

International Search Report for corresponding PCT/CN2022/112117, mailed Nov. 7, 2022. (8 pages) English Language translation attached (9 pages).

Group notification and unicast paging for MBS, R2-2104940, OPPO, 3GPP TSG-RAN WG2 Meeting #114 electronic, Online, May 19-27, 2021, Agenda Item 8.1.1, 5 pages.

Discussion MBS notification schemes, R2-2108523, CMCC, 3GPP TSG-RAN WG2 Meeting #115 electronic, Online, Aug. 6, 2021, Agenda Item 8.1.3.2, 4 pages.

Group notification and RACH congestion, R2-2104875, Intel Corporation, 3GPP TSG-ran WG2 Meeting # 114—electronic, Online, May 27, 2021, Agenda Item 8.1.1, 8 pages.

Office Action for corresponding CN application No. CN202110930512.8, mailed May 1, 2025 (21 pages) English and Chinese language translations.

Search Report for corresponding EP application No. EP22855532.2, mailed Jul. 10, 2025 (11 pages).

OPPO, Group notification and unicast paging for MBS activation, 3GPP TSG-RAN WG2 Meeting #115 electronic, Aug. 16-27, 2021, R2-2107016 (4 pages).

ZTE, Discussion and proposal on the awareness of NG-RAN MBS capability in the AMF, SA WG2 Meeting #S2-145E, May 17-28, 2021, S2-2104179 (4 pages).

Nokia, Shanghai-Bell, AMF multicast service notification service, 3GPP TSG-WG SA2 Meeting #146E e-meeting, Aug. 16-27, 2021, S2-2106454 (4 pages).

* cited by examiner

METHOD AND DEVICE FOR TRANSMITTING PAGING MESSAGE, AND METHOD AND DEVICE FOR RECEIVING PAGING MESSAGE

CROSS-REFERENCE TO RELATED APPLICATION

This disclosure is a national phase of International Application No. PCT/CN2022/112117, filed on Aug. 12, 2022, which claims a priority to Chinese Patent Application No. 202110930512.8, filed on Aug. 13, 2021 in China National Intellectual Property Administration, the entire content of which is incorporated herein by reference.

TECHNICAL FIELD

The disclosure relates to the field of wireless communication technologies, and particularly, to a method and a device for transmitting a paging message, and a method and a device for receiving a paging message.

BACKGROUND

If a user equipment (UE) supporting multicast and broadcast service (MBS) enters a radio resource control idle (RRC_IDLE) state after joining into an MBS session group through a join procedure and the MBS session is about to be activated, a network may page the UE according to stored information and inform the UE that there is the MBS session activated, so that the UE reenters a connected (RRC_CONNECTED) state to receive data of the MBS session activated.

SUMMARY

A method for transmitting a paging message includes:

when an MBS session is about to be activated, transmitting, by an access and mobility management function (AMF), a paging message to respective base stations in a paging area, according to respective situations of the base stations for supporting MBS.

A method for transmitting a paging message includes:

receiving, by a base station, a paging message from an AMF; and after reading, by the base station, information in the paging message according to a situation of the base station for supporting MBS, paging, by the base station, a UE.

A method for receiving a paging message includes:

receiving, by a UE, a paging message from a base station; and after reading, by the UE, information in the paging message according to a situation of the UE for supporting MBS, receiving, by the UE, an MBS session.

BRIEF DESCRIPTION OF THE DRAWINGS

Accompanying drawings described herein are used to provide a further understanding on the disclosure and constitute a part of this specification. Embodiments and descriptions of embodiments according to the disclosure are used to explain the disclosure and may not constitute a limitation of the disclosure. In the accompanying drawings.

DETAILED DESCRIPTION

The inventor has noticed in the invention procedure as follows.

There is no solution that may select a suitable manner for paging a UE to inform the UE that an MBS session is about to activated. At least one of following problems are existed. When a multicast-broadcast user plane function (MB-UPF) requests, the MBS session is about to be activated, or when the MB-UPF receives the multicast data, the MBS session is about to be activated.

According to the related art, for paging an RRC_IDLE UE, it is triggered by a core network and whether to use a group paging is also determined by an AMF. Therefore, it is a problem in the related art how to select a suitable AMF, how the AMF determines a group paging area, or how to page the UE under a case that there is a node not supporting multicast in the area.

In addition, when the UE receives a paging, a paging occasion (PO)/paging frame (PF) needs to be calculated in combination with a discontinuous reception (DRX) configuration of the UE. It is a problem to be solved how to calculate the PO or the PF under the group paging.

Meanwhile, in consideration of an energy saving requirement of the UE, it is an urgent problem to be solved how to reduce an extra power consumption caused by a false alarm to the UE, in which the false alarm to the UE is brought by the group paging.

On the basis of this, a solution for transmitting/receiving a paging message is provided according to embodiments of the disclosure. Implementations according to the disclosure will be described in combination with the accompanying drawings.

In descriptions, implementations at a side of an AMF, a side of a base station, and a side of a UE may be described in combination of examples of the implementations, to understand solution implementations according to embodiments of the disclosure better. The descriptions may not mean that implementations at the side of the AMF, the side of the base station, and the side of the UE must be performed with each other or separately. Actually, when implementations at the side of the AMF, the side of the base station, and the side of the UE are performed separately, the problems at the side of the AMF, the side of the base station, and the side of the UE may be solved by themselves, and when implementations at the side of the AMF, the side of the base station, and the side of the UE are performed with each other, a better technical effect may be obtained.

Figure 1:
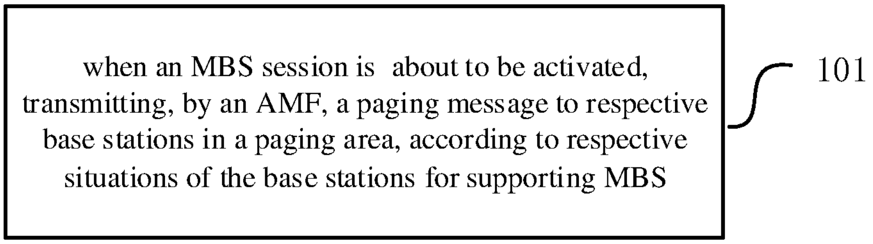
FIG. 1 is a flowchart illustrating an implementation of a method for transmitting a paging message at a side of an AMF according to embodiments of the disclosure.

FIG. 1 is a flowchart illustrating an implementation of a method for transmitting a paging message at a side of an AMF. As illustrated in FIG. 1, the method includes following step.

At step 101, when an MBS session is about to be activated, the AMF transmits a paging message to respective base stations in a paging area, according to respective situations of the base stations for supporting MBS.

Figure 2:
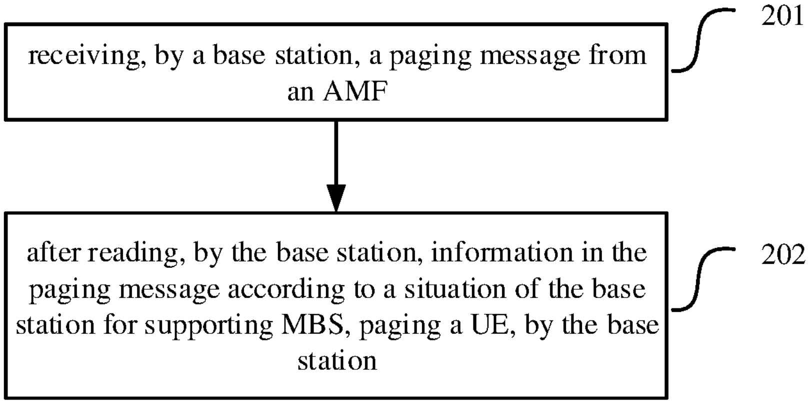
FIG. 2 is a flowchart illustrating an implementation of a method for transmitting a paging message at a side of a base station according to embodiments of the disclosure.

FIG. 2 is a flowchart illustrating an implementation of a method for transmitting a paging message at a side of a base station. As illustrated in FIG. 2, the method includes following steps.

At step 201, the base station receives a paging message from an AMF.

At step 202, after the base station reads information in the paging message according to a situation of the base station for supporting MBS, the base station pages a UE.

Figure 3:
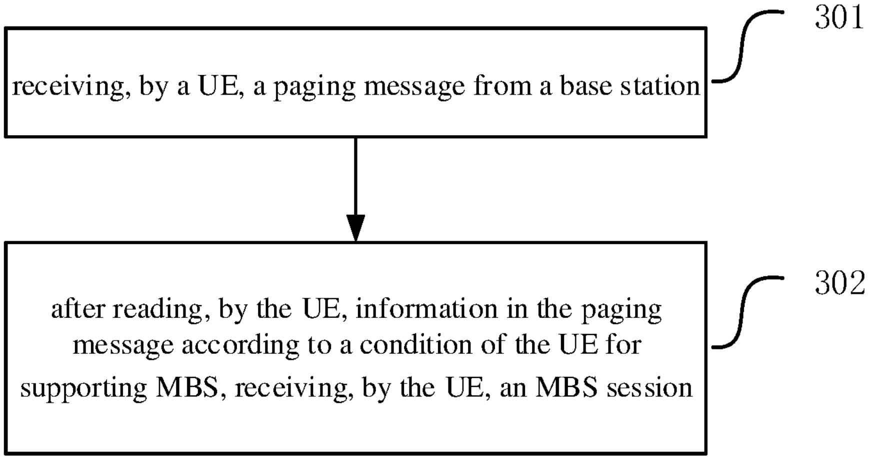
FIG. 3 is a flowchart illustrating an implementation of a method for receiving a paging message at a side of a UE according to embodiments of the disclosure.

FIG. 3 is a flowchart illustrating an implementation of a method for receiving a paging message at a side of a UE. As illustrated in FIG. 3, the method includes following steps.

At step 301, the UE receives a paging message from a base station.

At step 302, after the UE reads information in the paging message according to a situation of the UE for supporting MBS, the UE receives an MBS session. When the UE receives the MBS session, it also means that the UE receive data of the MBS session or the MBS service.

According to an implementation, the AMF determines whether the base station supports the MBS when establishing a next generation (NG) interface between the base station and the AMF.

An implementation of a next generation Node B (gNB) of a $5^{th}$ generation (5G) base station on establishing the NG interface/selecting the AMF is illustrated below.

When the NG interface is established between the gNB and the AMF, the gNB and the AMF may interact with each other about whether to support the MBS. For a gNB supporting the multicast and broadcast, the AFM supporting the multicast and broadcast may be preferentially selected to establish the NG interface, to support the MBS.

According to an implementation, the tracking area (TA) configuration mode includes any one of:

all base stations in a TA, supporting the MBS session, or all base stations in a TA, not supporting the MBS session; or a base station supporting the MBS session and a base station not supporting the MBS session being in the same TA.

The AMF may configure two types of TA configuration modes according to interacted information of the gNB whether to support the multicast and broadcast.

In a first mode, an existing TA configuration is adopted. Each TA may include a cell/gNB supporting the MBS session and a cell/gNB not supporting the MBS session. Identity may be added, to identify a cell not supporting the MBS session, or identify a cell supporting the MBS session, or identify both a cell not supporting the MBS session and a cell supporting the MBS session.

In a second mode, an MBS-dedicated TA configuration is adopted. In this configuration, two TA areas are included, one of which only includes a cell/gNB supporting the MBS session and the other of which only includes a cell/gNB not supporting the MBS session.

The following describes an implementation that the AMF triggers the paging to notify the UE of an upcoming session start.

According to an implementation, the AMF determines the paging area in any one or a combination of:

determining, by the AMF, a group paging area and an existing unicast paging area according to a TA list and multicast service group member information; or determining, by the AMF, a group paging area and a unicast paging area according to a TA configuration mode.

In detail, the AMF determines an area that needs to transmit a group paging according to the TA list and multicast service group member information in the related art, for example, taking a union of TA lists of UEs.

That is, the group paging area obtained according to any one of the above different TA configuration modes may be: a group paging area where all cells support the MBS session, including an MBS-dedicated TA and a TA incidentally supporting an MBS session indication, in which the AMF transmits the group paging to the gNB and this set of paging messages only includes MBS session information (such as a temporary mobile group identity (TMGI) and a multicast and broadcast address) that the session start is about to occur; and a group paging area where part of cells support the MBS session, that is, only part of TAs are the MBS-dedicated TA and the TA incidentally supporting the MBS session indication. Meanwhile, it may be obtained that a certain area is a non-group paging area, i.e. a common TA and a TA incidentally not supporting the MBS session indication.

For the non-group paging area, the AMF triggers a unicast paging, that is, a conventional paging message, that is, including UE identity (UE ID) information.

For the group paging area where all cells support the MBS session, that is, the area includes the MBS-dedicated TA and the TA incidentally supporting the MBS session indication, the AMF issues the group paging to the gNB, and this set of paging messages only includes MBS session information (such as the TMGI and the multicast and broadcast address) that the session start is about to occur; and meanwhile, it may also include UE ID information.

According to an implementation, the paging message is transmitted from the base station to the UE via a unicast paging message or a multicast-dedicated group paging message.

According to an implementation, the paging message is transmitted via the unicast paging message or a separate paging message.

According to an implementation, at the side of the AMF, transmitting the paging message to the respective base stations in the paging area according to the respective situations for supporting the MBS at the base stations in the paging area includes under a case that there is a base station supporting MBS in the paging area.

In a manner A, a set of group paging messages including MBS session information that a session start is about to occur, and a set of paging messages including UE ID information may be transmitted.

In a manner B, a set of paging messages including MBS session information that a session start is about to occur, and UE ID information corresponding to the MBS session may be transmitted.

In a manner C, a group paging message including MBS session information that a session start is about to occur may be transmitted.

At the side of the base station, reading by the base station the information in the paging message according to the situation for supporting MBS at the base station includes the following.

In a manner A, when a set of group paging messages including MBS session information that a session start is about to occur, and a set of paging messages including UE ID information are received:

the base station supporting MBS, selects the group paging message, and transmits the paging message including MBS session information at all POs, or the base station not supporting MBS selects the paging message, and transmits the paging message only including UE ID information at a PO corresponding to the UE ID.

In a manner B, when receiving a set of paging messages including MBS session information that a session start is about to occur and UE ID information corresponding to the MBS session is received:

the base station supporting MBS transmits the paging message including the MBS session information or including the MBS session information and carrying the UE ID information, at a PO corresponding to the UE ID information according to the UE ID information; or the base station not supporting MBS transmits the paging message only including the UE ID information at a PO corresponding to the UE ID information according to the UE ID information.

In a manner C, when a group paging message including MBS session information that a session start is about to occur is received:

the base station supporting MBS transmits the paging message including the MBS session information at all POs, or according to member information obtained from a core network, transmits the paging message including the MBS session information or including the MBS session information and carrying UE ID information only at a PO corresponding to a member; or after the base station not supporting MBS requests UE ID information corresponding to the AMF, the base station not supporting MBS transmits the paging message including a UE ID only at a PO corresponding to the UE ID.

The manner for acquiring the member information from the core network may be a join procedure based on a UE or a procedure the base station applies to the core network.

According to an implementation, the MBS session information includes any one or a combination of:

an MBS session ID, a TMGI, or a multicast IP address.

In detail, for the case that part of cells supports the MBS session, there are possible manners for transmitting the paging.

Group paging information is transmitted via an existing unicast paging message.

In a manner A, for all base stations/cells in the same group paging area, the AMF transmits two sets of paging messages, one of which only includes MBS session information (such as the TMG and the multicast and broadcast address) that the session start is about to occur, and the other of which is a conventional paging message, i.e. only includes UE ID information.

For base stations in the group paging area, a certain set of paging messages is selected by the base station to be transmitted at a radio access network (RAN) side according to whether the base stations may support MBS, that is, the base stations supporting MBS select the group paging message, and all POs include MBS session information; and for base stations not supporting MBS a legacy paging message is selected, that is, a corresponding PO includes the UE ID.

In a manner B, for all base stations/cells in the same group paging area, the AMF transmits the same set of paging messages which includes MBS session information (such as the TMGI and the multicast and broadcast address) that the session start is about to occur and UE ID information.

For base stations in the group paging area, a certain set of paging messages is selected to be transmitted at a RAN side according to whether the base stations may support the MBS, that is, the base stations supporting MBS select the group paging message, and POs corresponding to IDs in the UE ID list include MBS session information; and for the base stations not supporting MBS, the legacy paging message is selected, that is, the corresponding PO includes the UE ID.

In a manner C, for all base stations/cells in the same group paging area, the AMF only transmits the group paging message, that is, the message from the AMF only includes MBS session information (such as the TMGI and the multicast and broadcast address) that the session start is about to occur.

For the base stations supporting MBS, the group paging message is selected, and MBS session information is included at all POs; and for the base station not supporting MBS, interaction with the AMF is needed to request corresponding ID information, and the legacy paging message is transmitted at a corresponding PO, and the corresponding PO includes the UE ID.

Since the group paging message related to the MBS session is included in the legacy paging message, an extra power consumption may be brought for a UE not interested in an upcoming service and a UE not supporting or not subscribing to an MBS session, whether to include MBS session group paging information may be indicated via a short message, and specific service information or service group information may be possibly indicated. That is, according to an implementation, at the side of the base station, the method may further include: for the group paging message transmitted via the existing unicast message, indicating the UE whether the paging message includes the MBS session group paging information via the short message or whether the paging message is only the existing paging message. Correspondingly, at the side of the UE, whether the paging message includes the MBS session group paging information or whether the paging message only is the paging message is determined according to an indication of the short message.

In this case, after the UE supporting the MBS session receives the paging message at a corresponding PO, the UE further needs to read the MBS session information in addition to needing to read the UE ID list, and may not only read a part of the MBS session information and the UE ID list. That is, according to an implementation, the method may further include: when the UE supports the MBS session, after receiving the paging message at a PO corresponding to the MBS session, reading a UE ID list and MBS session information.

In detail, the base station selects and transmits corresponding content to the UE according to received information in combination with whether the base station itself supports the multicast and broadcast.

Since a same set of messages may be only transmitted to all base stations in one paging area, transmitting is performed according to the situation whether the base station supports the MBS session, not separately to a certain base station but also to nodes not supporting the MBS session in the area.

If all nodes in the paging area do not support the MBS session, the paging message may be only transmitted; only if there are one or more nodes supporting the MBS session in the paging area, a transmission may be performed according to one of the three manners.

2) The Group Paging Message is a Separate Paging Message.

Similar to the manner of the group paging message via the existing unicast paging message, the AMF may select a certain one of A, B and C to transmit the group paging message to all base stations in the paging area. The group paging message is transmitted at a group PO (G-PO)/group PF (G-PF) position for group paging. The group paging message may not include UE information, and only includes multicast service identity information that is about to be activated, such as an MBS session ID and a TMGI.

According to an implementation, the network may allocate additionally a radio network temporary identity (RNTI) for the MBS session group paging to the UE. According to an implementation, it is identified by a group paging RNTI (GP-RNTI) and allocated to the UE in a registration or join procedure of the UE.

When the UE is released to a non-connected state after joining, the UE retains a part of MBS session context, including but not limited to: a mapping between different MBS sessions and group-radio network temporary identities (G-RNTIs) (a mapping relationship between MBS sessions and G-RNTIs) and a GP-RNTI. That is, according to an implementation, the method may further include:

receiving, by the UE, a RNTI for an MBS session group paging message, allocated by a base station, in a registration or join procedure.

The method further includes: when the UE is released to a non-connected state after joining, retaining any one or a combination of a mapping relationship between different MBS sessions and G-RNTIs or a GP-RNTI.

An implementation of configuration and calculation of a G-PO/G-PF corresponding to group paging is described below.

According to an implementation, the method may further include:

configuring an MBS-dedicated DRX cycle via a system message.

In detail, the network configures an MBS-dedicated DRX cycle (the cycle may be same as a default unicast paging cycle in the cell) via the system message (for example, a system information bloc 1, SIB 1), and the network may configure more than one set of DRX configurations according to delay requirements of the service.

According to an implementation, at the side of the base station, the method may further include following manners.

In a first manner, the base station configures a fixed radio frame and subframe position for receiving the group paging message in the MBS-dedicated DRX cycle via a system message.

Or in a second manner, for multicast services configured with a same set of MBS-dedicated DRX cycle configurations, the base station disperses a time domain position at which an MBS session subscriber or interested user group needs to monitor paging, to different POs or PFs, according to service identity information of the MBS session.

Correspondingly, at the side of the UE, the method may further include following manners.

In a first manner, a fixed radio frame and subframe position for receiving a multicast-dedicated group paging message in an MBS-dedicated DRX cycle configured by the base station via a system message is received.

Or in a second manner, a same set of MBS-dedicated DRX cycle configurations configured by the base station for multicast services is received, and the UE monitors a group paging message when the UE wakes up at a PO or a PF corresponding to an MBS session the UE subscribes to, to confirm whether the MBS session is about to be activated.

In detail, for the PO/PF for receiving the paging message, there are two following manners.

In a first manner, the network configures a fixed radio frame and subframe position for receiving the group paging message in the cycle via a system message (such as a SIB1).

In a second manner, for multicast services configured with the same set of DRXs, the multicast services are dispersed in different POs or PFs according to the service identity information, that is, UEs that subscribe to a certain multicast service monitors the group paging when waking up at POs/PFs corresponding to the service to confirm whether the service is about to be activated, which may be in detail as follow:

A G-PF(SFN) is calculated by:

(SFN+PF_offset_multicast) mod T'=(T' div N)*(Multicast_ID mod N), where PF_offset_multicast is an offset of PF multicast, mod is a modulus calculation, div is a divergence, and Multicast_ID is a multicast ID.

A G-PO (Index (i_s)) is calculated by:

i_s=floor (Multicast_ID/N) mod Ns, where floor is a floor calculation.

in which,

T'=Multicast DRX cycle (configured by the network and related to a service delay requirement);

N: a number of total paging frames in one MBS session DRX cycle;

Ns: a number of G-POs in one G-PF;

PF_offset_multicast: an offset for determining a PF;

Multicast_ID: (TMGI, G-RNTI, MBS session ID, multicast IP address, or other fixed ID) mod 1024;

SFN is a system frame number.

In this case, a physical downlink control channel (PDCCH) for indicating the group paging may be scrambled by a paging-radio network temporary identity (P-RNTI) or a group-radio network temporary identity (G-RNTI)/GP-RNTI.

The following describes an implementation of conflict resolution between a G-PO and a legacy PO.

According to an implementation, at the side of the base station, the method may further include:

scrambling a group paging message via a G-RNTI or a GP-RNTI; or scrambling a group paging message and a unicast paging message via a P-RNTI.

Correspondingly, at the side of the UE, the method may further include:

descrambling a group paging message via a G-RNTI or a GP-RNTI; or descrambling a group paging message and a unicast paging message via a P-RNTI.

Inevitably, the G-PO position may collide with a legacy PO position in whole or in part, so that some UEs may not receive the multicast group paging and the unicast paging simultaneously, which may be solved by:

scrambling the group paging via the G-RNTI or the GP-RNTI, so that the UE may receive the group paging and the unicast paging simultaneously; and scrambling the group paging and the unicast paging via a P-RNTI.

According to an implementation, at the side of the base station, when the group paging message and the unicast paging message are scrambled via the P-RNTI, the method further includes:

configuring a receiving offset of a group-paging occasion (G-PO) or a unicast PO;

adding the group paging message in the unicast paging message; or configuring a UE energy saving mode.

Correspondingly, at the side of the UE, when the group paging message and the unicast paging message are descrambled via the P-RNTI, the method further includes:

receiving a receiving offset of a G-PO or a unicast PO;

receiving the unicast paging message added with the group paging message; or receiving a UE energy saving mode configured by the base station.

The receiving offset of the G-PO or the existing unicast PO is configured.

The network may configure the receiving offset (or an offset window) of the G-PO or the unicast PO, that is, the network may retransmit the G-PO or the unicast PO at the offset (window) position.

The offset may be configured via a system message, for example, included in a G-PO in the SIB1 or a legacy unicast paging configuration, or only a part of UEs are configured via a radio resource control (RRC) dedicated signaling, or both are used simultaneously. If there is an RRC configuration, it may be subject to the RRC configuration. When a collision occurs, the UE receives the group paging message or the unicast paging message at the offset (window) position according to the configuration. That is, according to an implementation, the receiving offset of the G-PO or the unicast PO is configured in any one or a combination of a system message or an RRC dedicated signaling.

B. The Group Paging Message is Added in the Unicast Paging Message.

According to an implementation, at the side of the UE, when the unicast paging message added with the group paging message is received, the method further includes:

when the UE supports the MBS session, reading an information element (IE) including an MBS session identity to confirm whether there is an MBS session that the UE is interested in/subscribes to, and reading and checking an IE including UE ID information in the paging message; or when the UE does not support the MBS session, reading and checking an IE including UE ID information in the message to confirm whether to receive a paging message from a network.

In detail, the gNB will add the group paging message in the unicast paging. For a UE receiving the paging message, if the UE supports the MBS session, in addition to checking the UE list, an MBS session identity part will be read to determine whether there is the MBS session; and if the UE does not support the MBS session, the UE list is only checked to confirm whether to receive a conventional paging from the network.

C. a UE Energy Saving Mode is Configured.

According to an implementation, at the side of the UE, when receiving the UE energy saving mode configured by the base station, the method may further include:

when not receiving a message the base station itself supports the MBS session from the base station, receiving a unicast paging only when waking up at an existing PO or a PF of the unicast paging.

In detail, when the base station does not broadcast whether to support the MBS session, the UE does not wake up at the multicast-dedicated PO or PF to receive the multicast-dedicated group paging message, and only wakes up at the PO or PF of the unicast paging to receive the unicast paging.

Since the multicast-dedicated PO/PF may be configured to for a multicast group paging receiving only in a cell supporting the multicast, the cell may broadcast whether to support the multicast via the system message, and may in detail broadcast specific supported service information, etc. When the network does not broadcast the information, the UE defaults that the cell does not support the multicast. Therefore, the UE does not need to wake up at the dedicated PO/PF to receive the multicast, and only needs to wake up at the PO/PF of the unicast paging to receive the unicast paging.

Based on the same invention concept, an AMF, a base station, a UE and a computer storage medium are further provided according to embodiments of the disclosure. Since principles that problems solved by these devices are similar to problems solved in the method for transmitting the paging message and the method for receiving the paging message, implementations of these devices may refer to implementations of the methods, which are not repeated herein.

The technical solutions according to embodiments of the disclosure may be implemented in following manners.

Figure 4:
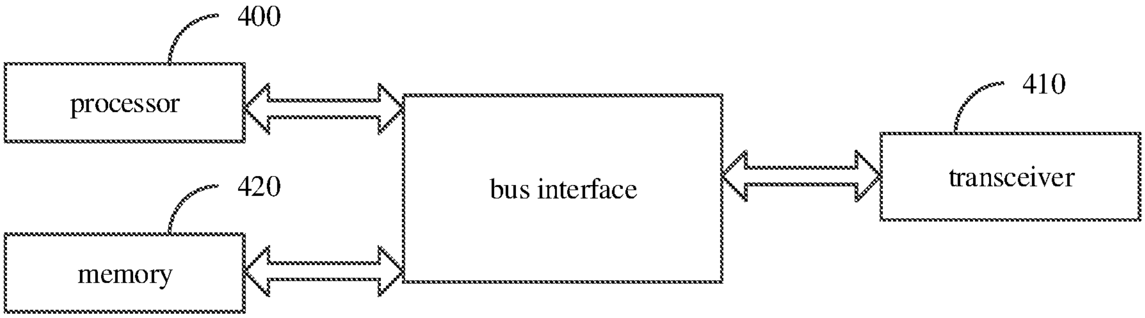
FIG. 4 is a diagram illustrating a structure of an AMF according to embodiments of the disclosure.

FIG. 4 is a diagram illustrating a structure of an AMF. As illustrated in FIG. 4, the AMF includes a processor 400 and a transceiver 410.

The processor 400 is configured to read a program stored 420 in a memory, to perform operations of:

when an MBS session is about to be activated, transmitting a paging message to respective base stations in a paging area, according to respective situations of the base stations for supporting MBS.

The transceiver 410 is configured to transmit and receive data under a control of the processor 400.

According to an implementation, the AMF determines whether the base station supports the MBS when establishing an NG interface between the base station and the AMF.

According to an implementation, the paging area is determined in any one or a combination of:

determining a paging area according to a TA list and multicast service group member information; or determining a unicast paging area according to a TA configuration mode.

According to an implementation, the TA configuration mode includes any one of:

all base stations in a TA, supporting the MBS session, or all base stations in a TA, not supporting the MBS session; or a base station supporting the MBS session and a base station not supporting the MBS session being in a same TA.

According to an implementation, the paging message is transmitted from the base station to the UE via a unicast paging message or a multicast-dedicated group paging message.

According to an implementation, transmitting the paging message to the respective base stations in the paging area according to the respective situations for supporting MBS at the base stations in the paging area includes under a case that there is a base station supporting MBS in the paging area, transmitting a set of group paging messages including MBS session information that a session start is about to occur, and a set of paging messages including UE ID information; or transmitting a set of paging messages including MBS session information that a session start is about to occur, and UE ID information corresponding to the MBS session; or transmitting a group paging message including MBS session information that a session start is about to occur.

According to an implementation, the MBS session information includes one or a combination of:

an MBS session ID, a TMGI, or a multicast IP address.

In FIG. 4, a bus architecture may include any number of interconnected buses and bridges, and in detail link various circuits such as one or more processors represented by the processor 400 and of memories represented by the memory 420. The bus architecture may further link various other circuits such as peripheral equipment, voltage regulators, and power management circuits, which are well known in the art and will not be further described herein. A bus interface provides an interface. The transceiver 410 may be a plurality of elements, i.e., a transmitter and a receiver, providing units for communicating with various other apparatuses on transmission media. The processor 400 is in charge of managing the bus architecture and general processing, and the memory 420 may store data used by the processor 400 in performing operations.

An AMF is further provided according to embodiments of the disclosure and includes an AMF paging module.

The AMF paging module is configured to, when an MBS session is about to activated, transmit a paging message to respective base stations in a paging area, according to respective situations of the base stations for supporting MBS in the paging area.

According to an implementation, the AMF determining module is further configured to determine whether the base station supports MBS when establishing an NG interface between the base station and the AMF.

According to an implementation, the AMF paging module is further configured to determine the paging area in any one or a combination of:

determining, by the AMF, a group paging area and a unicast paging area according to a TA list and multicast service group member information; or determining, by the AMF, a group paging area and a unicast paging area according to a TA configuration mode.

According to an implementation, the AMF paging module is further configured to, based on the TA configuration mode, include any one of:

all base stations in a TA, supporting the MBS session, or all base stations in a TA, not supporting the MBS session; or a base station supporting the MBS session and a base station not supporting the MBS session being in a same TA.

According to an implementation, the AMF paging module is further configured to transmit the paging message from the base station to the UE via a unicast paging message or a multicast-dedicated group paging message.

According to an implementation, the AMF paging module is further configured to transmit the paging message to the respective base stations in the paging area according to the respective situations for supporting MBS at the base stations in the paging area, by performing: under a case that there is a base station supporting MBS in the paging area, transmitting a set of group paging messages including MBS session information that a session start is about to occur, and a set of paging messages including UE ID information; or transmitting a set of paging messages including MBS session information that a session start is about to occur, and UE ID information corresponding to the MBS session; or transmitting a group paging message including MBS session information that a session start is about to occur.

According to an implementation, the AMF paging module is further configured to transmit MBS session information including any one or a combination of:

an MBS session ID, a TMGI, or a multicast IP address.

For ease of descriptions, components of the apparatus are respectively described by dividing into various modules or units in terms of function. Of course, when the disclosure is implemented, functions of various modules or units may be implemented in the same or multiple software or hardware.

Figure 5:
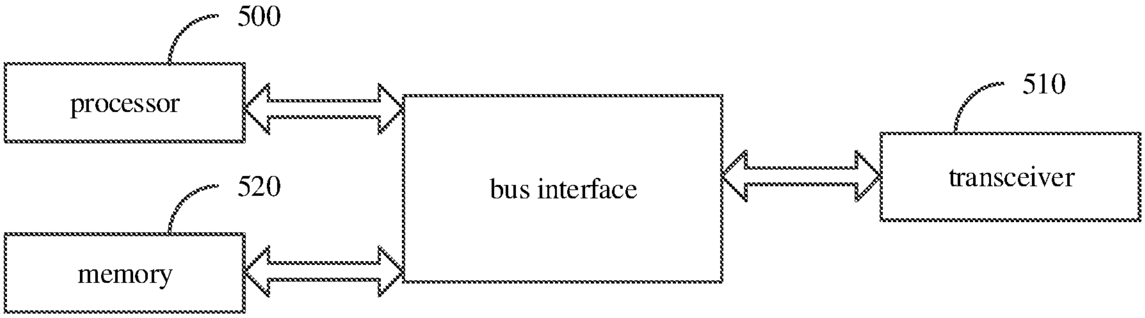
FIG. 5 is a diagram illustrating a structure of a base station according to embodiments of the disclosure.

FIG. 5 is a diagram illustrating a structure of a base station. As illustrated in FIG. 5, the base station includes a processor 500 and a transceiver 510.

The processor 500 is configured to read a program stored 520 in a memory, to perform operations of:

receiving a paging message from an AMF; and after reading information in the paging message according to a support situation of the base station for MBS, paging a UE; and The transceiver 510 is configured to transmit and receive data under a control of the processor 500.

According to an implementation, reading the information in the paging message according to the situation of the base station for supporting MBS includes:

in response to receiving a set of group paging messages including MBS session information that a session start is about to occur, and a set of paging messages including UE ID information, selecting, by the base station supporting MBS, the group paging message, and transmitting the paging message including MBS session information at all paging POs, or selecting, by the base station not supporting MBS, the paging message, and transmitting the paging message only including UE ID information at a PO corresponding to the UE ID;

or in response to receiving a set of paging messages including MBS session information that a session start is about to occur and UE ID information corresponding to the MBS session, transmitting, by the base station supporting MBS, the paging message including the MBS session information or including the MBS session information and carrying the UE ID information, at a PO corresponding to the UE ID information according to the UE ID information; or transmitting, by the base station not supporting MBS, the paging message only including the UE ID information at a PO corresponding to the UE ID information according to the UE ID information;

or, in response to receiving a group paging message including MBS session information that a session start is about to occur, transmitting, by the base station supporting MBS, the paging message including the MBS session information at all POs, or according to group member information obtained from a core network, transmitting the paging message including the MBS session information or including the MBS session information and carrying the UE ID information at a PO corresponding to a member only; or after the base station not supporting MBS requests corresponding UE ID information from the AMF, transmitting the paging message including a UE ID at a PO corresponding to the UE ID only.

According to an implementation, the base station further:

configures an MBS-dedicated DRX cycle via a system message.

According to an implementation, the paging message is transmitted from the base station to the UE via a unicast paging message or a multicast-dedicated group paging message.

According to an implementation, the PO at which the base station transmits the group paging message includes:

in response to transmitting via the unicast paging message, the PO being a PO obtained according to a UE ID; or in response to transmitting via the MBS-dedicated group paging message, the PO being a PO obtained according to MBS session information.

According to an implementation, the base station further:

for the group paging message transmitted via the unicast paging message, indicates whether to include MBS session group paging information or whether to include a type of MBS session group paging information via a short message.

According to an implementation, the base station further:

configures a fixed radio frame and subframe position for receiving the group paging message in the MBS-dedicated DRX cycle via a system message; or for multicast services configured with a same set of MBS-dedicated DRX cycle configurations, disperses a time domain position at which an MBS session subscriber or interested user group needs to monitor paging, to different POs or PFs, according to service identity information of the MBS session.

According to an implementation, the base station further:

scrambles the group paging message via a G-RNTI or a GP-RNTI; or scrambles the group paging message and the unicast paging message via a P-RNTI.

According to an implementation, when scrambling the group paging message and the unicast paging message via the P-RNTI, the base station further:

configures a receiving offset of a G-PO or a unicast PO;

add the group paging message in the unicast paging message; or configuring a UE energy saving mode.

According to an implementation, when the receiving offset of the G-PO or the unicast PO is configured in any one or a combination of:

a system message or an RRC dedicated signaling.

In FIG. 5, a bus architecture may include any number of interconnected buses and bridges, and in detail link various circuits such as one or more processors represented by the processor 500 and memories represented by the memory 520. The bus architecture may further link various other circuits such as peripheral equipment, voltage regulators, and power management circuits, which are well known in the art and will not be further described herein. A bus interface provides an interface. The transceiver 510 may be a plurality of elements, i.e., a transmitter and a receiver, for providing units for communicating with various other apparatuses on transmission media. The processor 500 is in charge of managing the bus architecture and general processing, and the memory 520 may store data used by the processor 500 in performing operations.

A base station is further provided according to embodiments of the disclosure, and includes a base station receiving module and a base station paging module.

The base station receiving module is configured to receive a paging message from an AMF.

The base station paging module is configured to, after reading information in the paging message according to a situation of the base station for supporting MBS, page a UE.

According to an implementation, the base station paging module is further configured to read the information in the paging message according to the situation for supporting MBS at the base station, by performing:

in response to receiving a set of group paging messages including MBS session information that a session start is about to occur, and a set of paging messages including UE ID information, selecting, by the base station supporting MBS, the group paging message, and transmitting the paging message including the MBS session information at all POs, or selecting, by the base station not supporting MBS, the paging message, and transmitting the paging message only including UE ID information at a PO corresponding to the UE ID;

or, in response to receiving a set of paging messages including MBS session information that a session start is about to occur and UE ID information corresponding to the MBS session, transmitting, by the base station supporting MBS, the paging message including the MBS session information or including the MBS session information and carrying the UE ID information, at a PO corresponding to the UE ID information according to the UE ID information; or transmitting, by the base station not supporting MBS, the paging message only including the UE ID information at a PO corresponding to the UE ID information according to the UE ID information;

or in response to receiving a group paging message including MBS session information that a session start is about to occur, transmitting, by the base station supporting MBS, the paging message including the MBS session information at all POs, or according to group member information obtained from a core network, transmitting the paging message including the MBS session information or including the MBS session information and carrying UE ID information only at a PO corresponding to a member; or after the base station not supporting MBS requests UE ID information corresponding to the AMF, transmitting the paging message including a UE ID only at a PO corresponding to the UE ID.

According to an implementation, the base station paging module is further configured to configure an MBS-dedicated DRX cycle via a system message.

According to an implementation, the base station paging module is further configured to transmit the paging message from the base station to the UE via a unicast paging message or a multicast-dedicated group paging message.

According to an implementation, the base station paging module is further configured to transmit the paging message at the PO. In response to transmitting via the unicast paging message, the PO is a PO obtained according to a UE ID; or in response to transmitting via the MBS-dedicated group paging message, the PO is a PO obtained according to MBS session information.

According to an implementation, the base station paging module is further configured to, for the group paging message transmitted via the unicast paging message, indicates whether to include MBS session group paging information or whether to include a type of MBS session group paging information via a short message.

According to an implementation, the base station paging module is further configured to, configure a fixed radio frame and subframe position for receiving the group paging message in the MBS-dedicated DRX cycle via a system message; or for multicast services configured with a same set of MBS-dedicated DRX cycle configurations, disperse a time domain position at which an MBS session subscriber or interested user group needs to monitor paging, to different POs or PFs, according to service identity information of the MBS session.

According to an implementation, the base station paging module is further configured to, scramble the group paging message via a G-RNTI or a GP-RNTI; or scramble the group paging message and the unicast paging message via a P-RNTI.

According to an implementation, the base station paging module is further configured to, when scrambling the group paging message and the unicast paging message via the P-RNTI, configure a receiving offset of a G-PO or a unicast PO; add the group paging message in the unicast paging message; and configure a UE energy saving mode.

According to an implementation, the base station paging module is further configured to, when configuring the receiving offset of the G-PO or the unicast PO, configure by any one or a combination of:

a system message or an RRC dedicated signaling.

For ease of descriptions, components of the apparatus are respectively described by dividing into various modules or units in terms of function. Of course, when the disclosure is implemented, functions of various modules or units may be implemented in the same or multiple software or hardware.

Figure 6:
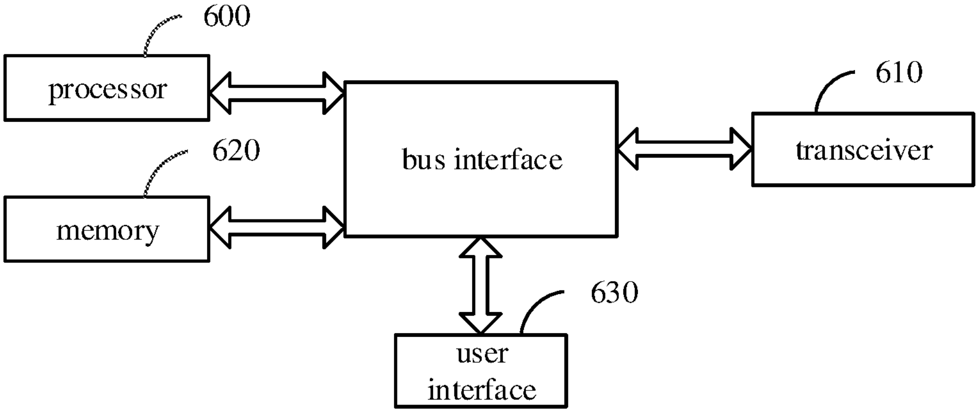
FIG. 6 is a diagram illustrating a structure of a UE according to embodiments of the disclosure.

FIG. 6 is a diagram illustrating a structure of a UE. As illustrated in FIG. 6, the UE includes a processor 600 and a transceiver 610.

The processor 600 is configured to read a program stored 620 in a memory, to perform operations of:

receiving a paging message from a base station; and after reading information in the paging message according to a situation of the UE for supporting MBS, receiving an MBS session.

The transceiver 610 is configured to transmit and receive data under a control of the processor 600.

According to an implementation, the UE further:

receives an RNTI for an MBS session group paging message, allocated by a base station in a registration or join procedure.

According to an implementation, the UE further:

when the UE is released to a non-connected state after joining, retains any one or a combination of MBS session context: a mapping relationship between different MBS sessions and G-RNTIs, or a GP-RNTI.

According to an implementation, the UE further:

when the UE supports the MBS session, after receiving the paging message at a PO corresponding to the MBS session, reads a UE ID list and MBS session information.

According to an implementation, the UE further:

determines whether the paging message includes MBS session group paging information or only is a paging message according to an indication of a short message.

According to an implementation, the UE further:

descrambles a group paging message via a G-RNTI or a GP-RNTI; or descrambles a group paging message and a unicast paging message via a P-RNTI.

According to an implementation, when descrambling the group paging message and the unicast paging message via the P-RNTI, the UE further:

receives a receiving offset of a G-PO or a unicast PO, configured by the base station;

receives the unicast paging message added with the group paging message; or receives a UE energy saving mode configured by the base station.

According to an implementation, receives the receiving offset of the G-PO or the PO configured by the base station, by any one or a combination of:

a system message or an RRC dedicated signaling.

According to an implementation, when receiving the unicast paging message adding the group paging message, the UE further:

when the UE supports the MBS session, reads an IE including an MBS session identity to confirm whether there is an MBS session that the UE is interested in/subscribes to, and reads and checks an IE including UE ID information in the paging message; or when the UE does not support the MBS session, reads and checks an IE including UE ID information in the message to confirm whether to receive a paging message from a network.

According to an implementation, when receiving the UE energy saving mode configured by the base station, the UE further:

when not receiving a message whether the base station itself supports the MBS session from the base station, receives a unicast paging only when waking up at a PO or a PF of the unicast paging.

According to an implementation, the UE further:

receives a fixed radio frame and subframe position for receiving a multicast-dedicated group paging message in an MBS-dedicated DRX cycle, configured by the base station via a system message; or receives a same set of MBS-dedicated DRX cycle configurations configured by the base station for a plurality of multicast services, and monitoring a group paging message when the UE wakes up at a PO or a PF corresponding to an MBS session the UE subscribes to, to confirm whether the MBS session is about to be activated.

In FIG. 6, a bus architecture may include any number of interconnected buses and bridges, and in detail link various circuits such as one or more processors represented by the processor 600 and of memories represented by the memory 620. The bus architecture may further link various other circuits such as peripheral equipment, voltage regulators, and power management circuits, which are well known in the art and will not be further described herein. A bus interface provides an interface. The transceiver 610 may be elements, i.e., include a transmitter and a receiver, and provides units for communicating with various other apparatuses on transmission media. For different user devices, the user interface 630 may be further an interface capable of externally and internally connecting required devices. The connected devices include, but are not limited to, keyboards, monitors, speakers, microphones, joysticks, etc.

The processor 600 is in charge of managing the bus architecture and general processing, and the memory 620 may store data used by the processor 600 in performing operations.

A UE is further provided according to embodiments of the disclosure, and includes a UE paging module and a UE receiving module.

The UE paging module is configured to receive a paging message from a base station.

The UE receiving module is configured to receive an MBS session after reading information in the paging message according to a situation of the UE for supporting MBS.

According to an implementation, the UE receiving module is further configured to, receive an RNTI for an MBS session group paging message, allocated by a base station in a registration or join procedure.

According to an implementation, the UE receiving module is further configured to, when the UE is released to a non-connected state after joining, retain any one or a combination of MBS session context: a mapping relationship between different MBS sessions and G-RNTIs, or a GP-RNTI.

According to an implementation, the UE receiving module is further configured to, when the UE supports the MBS session, after receiving the paging message at a PO corresponding to the MBS session, read a UE ID list and MBS session information.

According to an implementation, the UE receiving module is further configured to determine whether the paging message includes MBS session group paging information or only is a paging message according to an indication of a short message.

According to an implementation, the UE receiving module is further configured to, descramble a group paging message via a G-RNTI or a GP-RNTI; or descramble a group paging message and a unicast paging message via a P-RNTI.

According to an implementation, the UE receiving module is further configured to, when descrambling the group paging message and the unicast paging message via the P-RNTI, receive a receiving offset of a G-PO or a unicast PO, configured by the base station; receive the unicast paging message added with the group paging message; or receive a UE energy saving mode configured by the base station.

According to an implementation, the UE receiving module is further configured to, receive the receiving offset of the G-PO or the unicast PO configured by the base station, by any one or a combination of:

a system message or an RRC dedicated signaling.

According to an implementation, the UE receiving module is further configured to, when receiving the unicast PO added with the group paging message, when the UE supports the MBS session, read an IE including an MBS session identity to confirm whether there is an MBS session that the UE is interested in/subscribes to, and read and check an IE including UE ID information in the paging message; or when the UE does not support the MBS session, read and check an IE including UE ID information in the message to confirm whether to receive a paging message from a network.

According to an implementation, the UE receiving module is further configured to, when receiving the UE energy saving mode configured by the base station, and when not receiving a message whether the base station itself supports the MBS session from the base station, receive a unicast paging only when the UE wakes up at a PO or a PF of the unicast paging.

According to an implementation, the UE receiving module is further configured to receive a fixed radio frame and subframe position for receiving a multicast-dedicated group paging message in an MBS-dedicated DRX cycle, configured by the base station via a system message; or receive a same set of MBS-dedicated DRX cycle configurations configured by the base station for a plurality of multicast services, and listen to a group paging message when the UE wakes up at a PO or a PF corresponding to an MBS session the UE subscribes to, to confirm whether the MBS session is about to be activated.

A computer-readable storage medium is provided. The computer-readable storage medium stores a computer program for implementing the method for transmitting the paging message at the side of the AMF, the method for transmitting the paging message at the side of the base station, or the method for receiving the paging message at the side of the UE.

For ease of descriptions, components of the apparatus are respectively described by dividing into various modules or units in terms of function. Of course, when the disclosure is implemented, functions of various modules or units may be implemented in the same or multiple software or hardware.

A computer-readable storage medium is provided according to embodiments of the disclosure. The computer-readable storage medium stores a computer program for implementing the method for transmitting the paging message at the side of the AMF, the method for transmitting the paging message at the side of the base station, or the method for receiving the paging message at the side of the UE.

The implementations may refer to the method for transmitting the paging message at the side of the AMF, the method for transmitting the paging message at the side of the base station, or the method for receiving the paging message at the side of the UE.

In summary, in the technical solutions provided according to embodiments of the disclosure, the AMF transmits the paging message to the base station as follows.

The AMF transmits two sets of paging messages, one of which only includes MBS session information (such as the TMGI and the multicast and broadcast address) that the session start is about to occur, and the other of which is a conventional paging message, i.e. only includes UE ID information.

The AMF transmits the same set of paging messages which includes MBS session information (such as the TMGI and the multicast and broadcast address) that the session start is about to occur and UE ID information.

The AMF only transmits the group paging message, that is, the message from the AMF only includes MBS session information (such as the TMGI and the multicast and broadcast address) that the session start is about to occur.

An MBS-dedicated paging configuration and a G-PO/PF calculation solution are further provided.

A solution that an MBS session group paging is scrambled by a dedicated RNTI or a G-RNTI is further provided.

An MBS session context is further retained when the UE enters an idle/inactive state after joining, including but not limited to: mapping between different MBS sessions and G-RNTIs (a mapping relationship between MBS sessions and G-RNTIs) or a GP-RNTI.

Whether to support the MBS session when the NG interface is established is considered.

The MBS session is considered for a TA configuration.

A G-PO/unicast PO offset (window) configuration solution is further provided.

A solution that the network broadcasts whether to support the multicast and may broadcast a specific supported service is further provided.

Based on the above solutions, it may be ensured to select a suitable manner at different base stations to page the UEs to inform that the MBS session is about to be activated, and the influence on the UE is reduced as much as possible.

Those skilled in the art shall understand that embodiments in the disclosure may be provided as methods, systems, or computer program products. Therefore, the disclosure may adopt a form of full hardware embodiments, full software embodiments, or embodiments combining software and hardware. Further, the disclosure may adopt a form of a computer program product implemented on one or more computer usable storage media (including but not limited to a disk memory and an optical memory) including a computer usable program code.

The disclosure is described with reference to flowcharts and/or block diagrams of methods, devices (systems), and computer program products according to embodiments of the disclosure. It should be understood that each process and/or block in the flowchart and/or the block diagram, and a combination of the process and/or the block in the flowchart and/or the block diagram, may be implemented by computer program instructions. The computer program instructions may be provided to a processor of a general-purpose computer, a dedicated computer, an embedded processor, or other programmable data processing devices to produce a machine such that instructions executed by the processor of the computer or other programmable data processing devices may produce an apparatus for implementing functions specified in one or more processes of the flowchart and/or in one or more blocks of the block diagram.

The computer program instructions may also be stored in a computer-readable memory capable of guiding the computer or the other programmable data processing devices to operate in a particular manner such that the instructions stored in the computer-readable memory produce an article of manufacture including an instruction apparatus that implements the function specified in one or more processes of the flowchart and/or in one or more blocks of the block diagram.

The computer program instructions may be loaded onto a computer or other programmable data processing devices such that a series of operation steps are performed on the computer or the other programmable devices to produce the processing implemented by the computer such that the instructions executed on the computer or the other programmable devices provide steps of functions specified in one or more processes of the flowchart and/or in one or more blocks of the block diagram.

It may be understood that functions described according to embodiments of the disclosure may be implemented with hardware, software, a firmware, and combination thereof. For a hardware implementation, modules, units, sub-modules, subunits, etc., may be implemented in one or more application specific integrated circuits (ASICs), digital signal processors (DSPs), digital signal processing devices (DSPDs), programmable logic devices (PLDs), field-programmable gate arrays (FPGAs), general-purpose processors, controllers, microcontrollers, microprocessors, other electronic units for performing functions of the disclosure, or a combination thereof.

Obviously, those skilled in the art may make various modifications and variations to the disclosure without deviating from the spirit and scope of the disclosure. Thus, if these modifications and variations of the disclosure fall within the scope of claims of the disclosure and their equivalents, the disclosure present also intended to include such modifications and variations.

What is claimed is:

1. A method for transmitting a paging message, comprising:

when a multicast and broadcast service (MBS) session is about to be activated, transmitting, by an access and mobility management function (AMF), a paging message to respective base stations in a paging area, according to respective situations of the base stations for supporting MBS;

wherein transmitting, by the AMF, the paging message to the respective base stations in the paging area comprises under a case that there is a base station supporting MBS in the paging area, transmitting a paging message comprising MBS session information and user equipment (UE) identity (ID) information.

2. The method according to claim 1, further comprising:

determining, by the AMF, a situation of each base station for supporting MBS by establishing a next generation (NG) interface between each base station and the AMF.

3. The method according to claim 1, further comprising:

determining, by the AMF, the paging area in any one or a combination of:

determining, by the AMF, a group paging area and a unicast paging area according to a tracking area (TA) list and multicast service group member information; or determining, by the AMF, a group paging area and a unicast paging area according to a TA configuration mode.

4. The method according to claim 3, wherein the TA configuration mode comprises any one of:

all base stations in a TA, supporting the MBS session, or all base stations in a TA, not supporting the MBS session; or a base station supporting the MBS session and a base station not supporting the MBS session being in a same TA.

5. The method according to claim 1, wherein the paging message is transmitted from the base station to a user equipment (UE) via a unicast paging message or a multicast-dedicated group paging message.

6. The method according to claim 1, wherein the MBS session information comprises any one or a combination of:

an MBS session ID, a temporary mobile group identity (TMGI), or a multicast IP address.

7. A method for transmitting a paging message, comprising:

receiving, by a base station, a paging message from an access and mobility management function (AMF); and after reading, by the base station, information in the paging message according to a situation of the base station for supporting MBS, paging a user equipment (UE), by the base station;

wherein reading by the base station the information in the paging message comprises:

in response to receiving a paging message comprising MBS session information and UE identity (ID) information corresponding to the MBS session, transmitting, by the base station supporting MBS, the paging message comprising the MBS session information and carrying the UE ID information, at a PO corresponding to the UE ID information, according to the UE ID information.

8. The method according to claim 7, further comprising: configuring, by the base station, an MBS-dedicated discontinuous reception (DRX) cycle via a system message.

9. The method according to claim 7, wherein the paging message is transmitted from the base station to the UE via a unicast paging message or a multicast-dedicated group paging message.

10. The method according to claim 9, wherein the PO at which the base station transmits the group paging message comprises:

in response to transmitting via the unicast paging message, the PO being a PO obtained according to a UE ID; or in response to transmitting via the MBS-dedicated group paging message, the PO being a PO obtained according to MBS session information.

11. The method according to claim 9, further comprising: for the group paging message transmitted via the unicast paging message, indicating whether to comprise MBS session group paging information or whether to comprise a type of MBS session group paging information via a short message.

12. The method according to claim 9, further comprising: configuring, by the base station, a fixed radio frame and subframe position for receiving the group paging message, in the MBS-dedicated DRX cycle, via a system message; or for multicast services configured with a same set of MBS-dedicated DRX cycle configurations, dispersing, by the base station, a time domain position at which an MBS session subscriber or interested user group needs to monitor paging, to different paging occasions (POs) or paging frames (PFs), according to service identity information of the MBS session.

13. The method according to claim 9, further comprising: scrambling the group paging message via a group-radio network temporary identity (G-RNTI) or a group paging-radio network temporary identity (GP-RNTI); or scrambling the group paging message and the unicast paging message via a paging-radio network temporary identity (P-RNTI).

14. The method according to claim 13, wherein when scrambling the group paging message and the unicast paging message via the P-RNTI, the method further comprises:

configuring a receiving offset of a group-paging occasion (G-PO) or a unicast paging occasion (PO);

adding the group paging message in the unicast paging message; or configuring a UE energy saving mode.

15. A method for receiving a paging message, comprising:

receiving, by a user equipment (UE), a paging message from a base station; and after reading, by the UE, information in the paging message according to a situation of the UE for supporting MBS, receiving, by the UE, a multicast and broadcast service (MBS) session;

wherein reading, by the UE, information in the paging message comprises:

reading a paging message comprising the MBS session information and carrying UE identity (ID) information, at a PO corresponding to the UE ID information, according to the UE ID information.

16. The method according to claim 15, further comprising:

receiving, by the UE, a radio network temporary identity (RNTI) for an MBS session group paging message, allocated by a base station, in a registration or join procedure.

17. The method according to claim 15, further comprising:

determining whether the paging message comprises MBS session group paging information or only is a paging message according to an indication of a short message.

18. The method according to claim 15, further comprising:

descrambling a group paging message via a group-radio network temporary identity (G-RNTI) or a group paging-radio network temporary identity (GP-RNTI); or, descrambling a group paging message and a unicast paging message via a paging-radio network temporary identity (P-RNTI).

* * * * *